United States Patent
Hamatani et al.

(10) Patent No.: US 10,081,042 B2
(45) Date of Patent: Sep. 25, 2018

(54) ELECTRIC RESISTANCE WELDED STEEL PIPE EXCELLENT IN WELD ZONE AND METHOD OF PRODUCTION OF SAME

(71) Applicant: Nippon Steel & Sumitomo Metal Corporation, Tokyo (JP)

(72) Inventors: Hideki Hamatani, Tokyo (JP); Kenichi Yamamoto, Tokyo (JP); Masafumi Miyazaki, Tokyo (JP); Masaki Ina, Tokyo (JP); Takaaki Fukushi, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 255 days.

(21) Appl. No.: 14/911,601

(22) PCT Filed: Aug. 7, 2014

(86) PCT No.: PCT/JP2014/070872
§ 371 (c)(1),
(2) Date: Feb. 11, 2016

(87) PCT Pub. No.: WO2015/022899
PCT Pub. Date: Feb. 19, 2015

(65) Prior Publication Data
US 2016/0193641 A1 Jul. 7, 2016

(30) Foreign Application Priority Data
Aug. 16, 2013 (JP) .................. 2013-169138
Dec. 19, 2013 (JP) .................. 2013-262555

(51) Int. Cl.
*C22C 38/26* (2006.01)
*C22C 38/02* (2006.01)
(Continued)

(52) U.S. Cl.
CPC ............ *B21C 37/08* (2013.01); *B22D 11/001* (2013.01); *B23K 11/0873* (2013.01);
(Continued)

(58) Field of Classification Search
CPC .............................. B22D 11/001; C21D 8/105
See application file for complete search history.

(56) References Cited

U.S. PATENT DOCUMENTS 9,726,305 B2 * 8/2017 Shinohara ................ F16L 9/02
2013/0092280 A1 4/2013 Sawamura et al.
(Continued)

FOREIGN PATENT DOCUMENTS

CN 102046829 A 5/2011
CN 103069020 A 4/2013
(Continued)

OTHER PUBLICATIONS

International Search Report dated Nov. 4, 2014, issued in corresponding PCT Application No. PCT/JP2014/070872.

*Primary Examiner* — Scott R Kastler
(74) *Attorney, Agent, or Firm* — Birch, Stewart, Kolasch & Birch, LLP

(57) ABSTRACT

Electric resistance welded steel pipe excellent in weld zone quality suitable for oil country tubular goods and line pipe wherein steel plate forming the base metal of the electric resistance welded steel pipe has a predetermined chemical composition, the contents of Ca, O, S, Ce, La, and Al satisfy $$XCASO = \left(\frac{Ca}{O} + \frac{Ca}{S} + 0.285\frac{Ce+La}{O} + 0.285\frac{Ce+La}{S}\right) \times \left(\frac{Al}{Ca}\right) > 78$$

(Continued)

the oxide-based inclusions in the weld zone of the electric resistance welded steel pipe contains one or both of Ce and La, and the long axis/short axis of the oxide-based inclusions is 2.5 or less.

6 Claims, 4 Drawing Sheets

(51) Int. Cl.

| | | |
|---|---|---|
| B21C 37/08 | (2006.01) | |
| C22C 38/00 | (2006.01) | |
| C22C 38/14 | (2006.01) | |
| C22C 38/58 | (2006.01) | |
| C21D 8/10 | (2006.01) | |
| C22C 38/04 | (2006.01) | |
| C22C 38/12 | (2006.01) | |
| B22D 11/00 | (2006.01) | |
| B23K 11/087 | (2006.01) | |
| B23K 11/34 | (2006.01) | |
| C21D 9/14 | (2006.01) | |
| C22C 33/04 | (2006.01) | |
| C22C 38/06 | (2006.01) | |
| C22C 38/08 | (2006.01) | |
| C22C 38/16 | (2006.01) | |
| C22C 38/24 | (2006.01) | |
| C22C 38/28 | (2006.01) | |
| C21D 9/08 | (2006.01) | |

(52) U.S. Cl.
CPC ............. *B23K 11/34* (2013.01); *C21D 8/105* (2013.01); *C21D 9/14* (2013.01); *C22C 33/04* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/24* (2013.01); *C22C 38/26* (2013.01); *C22C 38/28* (2013.01); *C22C 38/58* (2013.01); *C21D 9/08* (2013.01)

(56) References Cited

U.S. PATENT DOCUMENTS

| | | | |
|---|---|---|---|
| 2014/0318672 A1 | 10/2014 | Yokoi et al. | |
| 2016/0193641 A1* | 7/2016 | Hamatani | B21C 37/08 148/505 |
| 2016/0230241 A1* | 8/2016 | Fukushi | C22C 38/44 |
| 2016/0319404 A1* | 11/2016 | Kiyota | C21D 9/08 |

FOREIGN PATENT DOCUMENTS

| | | |
|---|---|---|
| EP | 2036995 A1 | 3/2009 |
| EP | 2395122 A1 | 12/2011 |
| EP | 2592169 A1 | 5/2013 |
| EP | 2666880 A1 | 11/2013 |
| JP | 09-209025 | 8/1997 |
| JP | 2002-146481 | 5/2002 |
| JP | 2002-161329 | 6/2002 |
| JP | 2004-35946 | 2/2004 |
| JP | 2007-327100 | 12/2007 |
| JP | 2008 208452 | 9/2008 |
| JP | 2009-57629 A | 3/2009 |
| JP | 2010-209433 A | 9/2010 |
| JP | 2012-246548 | 12/2012 |
| JP | 2012-246550 | 12/2012 |
| WO | WO 2012/099119 A1 | 7/2012 |

* cited by examiner

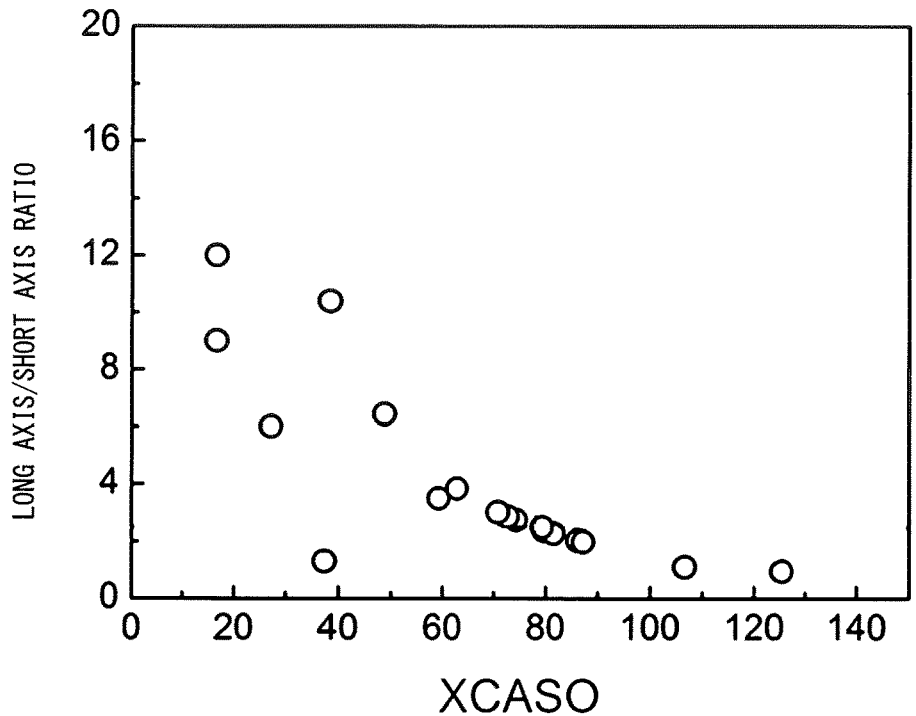
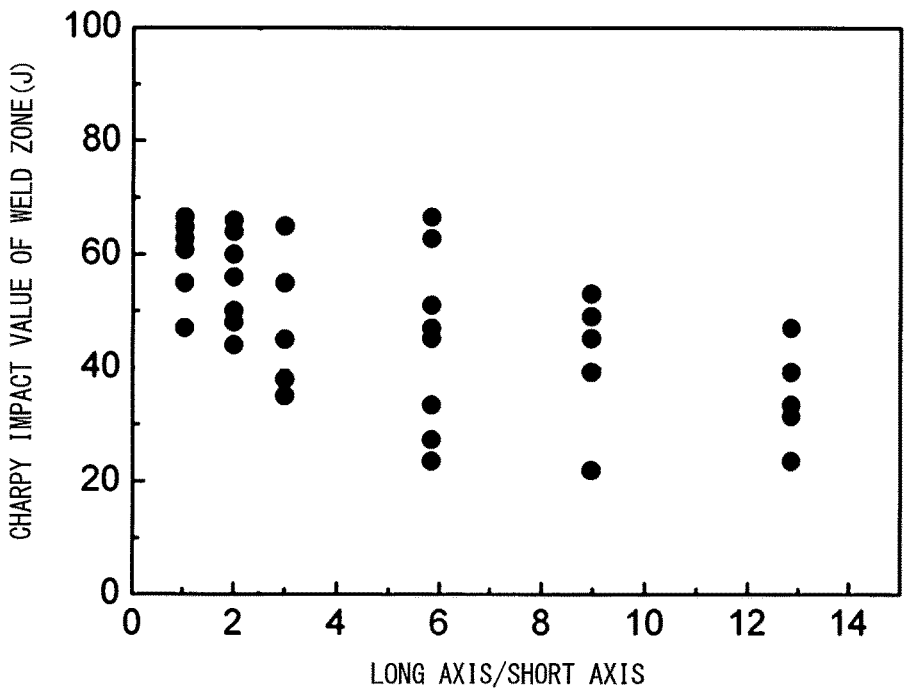

ELECTRIC RESISTANCE WELDED STEEL PIPE EXCELLENT IN WELD ZONE AND METHOD OF PRODUCTION OF SAME

CROSS REFERENCE TO RELATED APPLICATIONS

This application is a national stage application of International Application No. PCT/JP2014/070872, filed on Aug. 7, 2014, which is incorporated herein by reference in its entirety, and which claims the benefit of JP Application Nos. 2013-169138, filed on Aug. 16, 2013, and 2013-262555, filed on Dec. 19, 2013.

TECHNICAL FIELD

The present invention provides electric resistance welded steel pipe excellent in weld zone quality suitable for oil country tubular goods and line pipe and a method of production of the same.

BACKGROUND ART

Oil, natural gas, etc. are produced in the North Sea, Alaska, and other arctic areas in many cases. For this reason, oil country tubular goods and line pipe which are used for conveyance of the produced oil, natural gas, etc. are required to have low temperature toughness.

In the past, as oil country tubular goods and line pipe, seamless steel pipe and electric resistance welded steel pipe have been used. In recent years, from the viewpoint of cutting drilling costs, demand for electric resistance welded steel pipe has been rising. Along with this, various art is being developed for electric resistance welded steel pipe excellent in low temperature toughness. Specifically, improvement of toughness of the material by limiting the finishing temperature of the hot rolling process and the coiling temperature, refinement of the crystal grains by the addition of Nb and V, heat treatment of the pipe bodies after pipemaking, etc. may be mentioned.

In recent years, along with the increasing harshness of the environments of use of electric resistance welded steel pipe, demand for SSC resistance and low temperature toughness has been rising. To satisfy these demands, the method of adding Ca is known to be effective.

PLT 1 discloses the art of making the S concentration in the molten steel 7 ppm or less, then treating this molten steel with Ca to control the ratio of the Ca concentration and oxygen concentration to $1.19<([Ca]/[O])<2.11$ and controlling the speed of addition of Ca to $0.023<V[kg/(t\cdot min)]<0.7$.

Research in recent years has revealed that electric resistance welded steel pipe to which Ca has been added sometimes remarkably falls in toughness of the electric resistance weld zone compared with the base metal part. The cause of this drop in toughness of the electric resistance weld zone has been found to be the inclusions present at the electric resistance weld zone and its vicinity being pressed from both sides and deforming to plate shapes. Further, the inclusions which deform to the plate shapes were analyzed for chemical composition. As a result, they were found to be composite inclusions which have molecular ratios of composition of $mCaO \cdot nAl_2O_3$ (where, m, n are integers, same below).

PLT 2 discloses as art which solves the problem of the drop in toughness of the electric resistance weld zone the art of making the total amount of Si, Mn, Al, Ca, and Cr which are contained in inclusions with a circle equivalent diameter of 20 μm or more in the inclusions which are present at the electric resistance weld zone of electric resistance welded steel pipe a mass % of 20 ppm or less with respect to the total amount of the electric resistance weld zone which contains the base iron.

PLT 3 discloses the art of making the total amount of Si, Mn, Al, Ca, and Cr which are contained in inclusions with a circle equivalent diameter of 2 μm or more in the inclusions which are present at the electric resistance weld zone of electric resistance welded steel pipe a mass % of 99 ppm or less with respect to the total amount of the electric resistance weld zone which contains the base iron.

CITATIONS LIST

Patent Literature

PLT 1: Japanese Patent Publication No. 9-209025A
PLT 2: Japanese Patent Publication No. 2012-246548A
PLT 3: Japanese Patent Publication No. 2012-246550A

SUMMARY OF INVENTION

Technical Problem

There is the problem that $mCaO \cdot nAl_2O_3$ inclusions which are deformed to plate shapes still remain near the electric resistance weld zone even if using these prior art and cause a drop in toughness of the electric resistance weld zone. FIG. 1 shows an outline of electric resistance welding of electric resistance welded steel pipe. The electric resistance welding is performed by bending the steel plate to make the ends abut, using a high frequency current to make the ends of the steel plate melt, and applying upset (load) to expel the molten steel.

In electric resistance welding, the surroundings of the weld zone are heated up to near the melting point of the steel, so inclusions behave differently than when rolling steel plate etc. and easily deform in state. That is, the $mCaO \cdot nAl_2O_3$ inclusions remaining near the electric resistance weld zone become lower in hardness by the surroundings of the weld zone being heated and are stretched in the thickness direction at the time of upset. The coarse inclusions become the cause of the drop of toughness of the weld zone.

The object of the present invention solves the above problem and provides art for avoiding a drop in the toughness of the electric resistance weld zone in electric resistance welded steel pipe which is provided with SSC resistance and low temperature toughness and which is used for oil country tubular goods and line pipe.

Solution to Problem

The inventors engaged in intensive studies on the method of avoiding a drop in the toughness of the electric resistance weld zone in electric resistance welded steel pipe. As a result, they discovered that by making the inclusions in the steel plate fine ones which are hard even at high temperatures, the inclusions can be kept from being rolled at the time of upset and becoming the cause of a drop in toughness.

Specifically, by adding at least one of Ce and La in suitable amounts before adding Ca in the refining process and then adding Ca, it becomes possible to make the inclusions a state of hard XCaAlOS (X is Ce or La, the same below) finely dispersed. The inventors discovered that these inclusions are not stretched at the time of upset, so as a result it is possible to avoid a drop in toughness of the electric resistance weld zone. FIG. 2 shows the outlines of this.

The present invention was made based on this finding and has as its gist the following:

(1) An electric resistance welded steel pipe excellent in weld zone quality, wherein a chemical composition of a steel plate forming a base metal of the electric resistance welded steel pipe contains, by mass %, C: 0.03 to 0.15%, Si: 0.1 to 0.3%, Mn: 0.5 to 2.0%, Al: 0.01 to 0.06%, Ti: 0.011 to 0.023%, Ca: 0.001 to 0.005%, one or a total of both of Ce and La alone: 0.001 to 0.005%, P: 0.03% or less, S: 0.0015% or less, O: 0.002% or less, and N: 0.005% or less, further contains one or more of
Nb: 0.1% or less, V: 0.1% or less, Mo: 0.2% or less, and B: 0.002% or less, and a balance of iron and unavoidable impurities; the contents of Ca, O, S, Ce, La, and Al satisfying formula $$XCASO = \left(\frac{Ca}{O} + \frac{Ca}{S} + 0.285\frac{Ce+La}{O} + 0.285\frac{Ce+La}{S}\right) \times \left(\frac{Al}{Ca}\right) > 78;$$

oxide-based inclusions at a weld zone of the electric resistance welded steel pipe contain one or both of Ce and La; and a long axis/short axis of the oxide-based inclusions is 2.5 or less.

(2) The electric resistance welded steel pipe excellent in weld zone quality according to the above (1), wherein the chemical composition of the steel plate further contains, by mass %, one or more of Cu: 0.1 to 2%, Ni: 0.05 to 1%, Cr: 0.01 to 1%, and Zr: 0.001 to 0.01%.

(3) The electric resistance welded steel pipe excellent in weld zone quality according to the above (1) or (2), wherein a tensile strength of the base metal is 860 MPa or more, a toughness of the base metal at 0° C. is 100 J or more, and a toughness of a weld zone of the electric resistance welded steel pipe at 0° C. is 40 J or more.

(4) The electric resistance welded steel pipe excellent in weld zone quality according to the above (1) or (2), wherein a tensile strength of the base metal is 500 MPa to 620 MPa, a toughness of the base metal at −40° C. is 100 J or more, and a weld zone toughness of a weld zone of the electric resistance welded steel pipe at −40° C. is 100 J or more.

(5) A method of production of electric resistance welded steel pipe excellent in weld zone quality, comprising the steps of: in a refining process of steelmaking, adjusting a chemical composition of a molten steel so as to contain, by mass %, C: 0.03 to 0.15%, Si: 0.1 to 0.3%, Mn: 0.5 to 2.0%, Al: 0.01 to 0.06%, Ti: 0.011 to 0.023%, P: 0.03% or less, S: 0.0015% or less, O: 0.002% or less, and N: 0.005% or less, further contain one or more of Nb: 0.1% or less, V: 0.1% or less, Mo: 0.2% or less, and B: 0.002% or less, and a balance of iron and unavoidable impurities; then adding one or both of Ce and La to the molten steel to give total contents of Ce and La of 0.001 to 0.005%; then adding Ca to the molten steel to give a content of Ca of 0.0010 to 0.0050%, and adjusting the contents of Ca, O, S, Ce, La, and Al so as to satisfy the formula:

$$XCASO = \left(\frac{Ca}{O} + \frac{Ca}{S} + 0.285\frac{Ce+La}{O} + 0.285\frac{Ce+La}{S}\right) \times \left(\frac{Al}{Ca}\right) > 78;$$

manufacturing a steel slab from the molten steel; hot rolling the steel slab to obtain hot rolled steel plate; coiling the hot rolled steel plate; and manufacturing electric resistance welded steel pipe from the coiled hot rolled steel plate.

(6) The method of production of electric resistance welded steel pipe excellent in weld zone quality according to the above (5), wherein in the refining process of steelmaking, the chemical composition of the molten steel before adding one or both of Ce and La to the molten steel further contains, by mass %, Cu: 0.1 to 2%, Ni: 0.05 to 1%, Cr: 0.01 to 1%, and Zr: 0.001 to 0.01%.

Advantageous Effects of Invention

According to the present invention, it is possible to obtain electric resistance welded steel pipe in which a drop of toughness of the electric resistance weld zone is avoided, which is provided with SSC resistance and low temperature toughness, and which is suitable for oil country tubular goods and line pipe.

BRIEF DESCRIPTION OF DRAWINGS

FIG. 3 is a view which shows the relationship between the XCASO and long axis/short axis of inclusions.

FIG. 4 is a graph which shows the long axis/short axis of inclusions and the Charpy impact value of the weld zone at 0° C. in particular of the electric resistance welded steel pipe suitable for oil country tubular goods.

DESCRIPTION OF EMBODIMENTS

Figure 1:
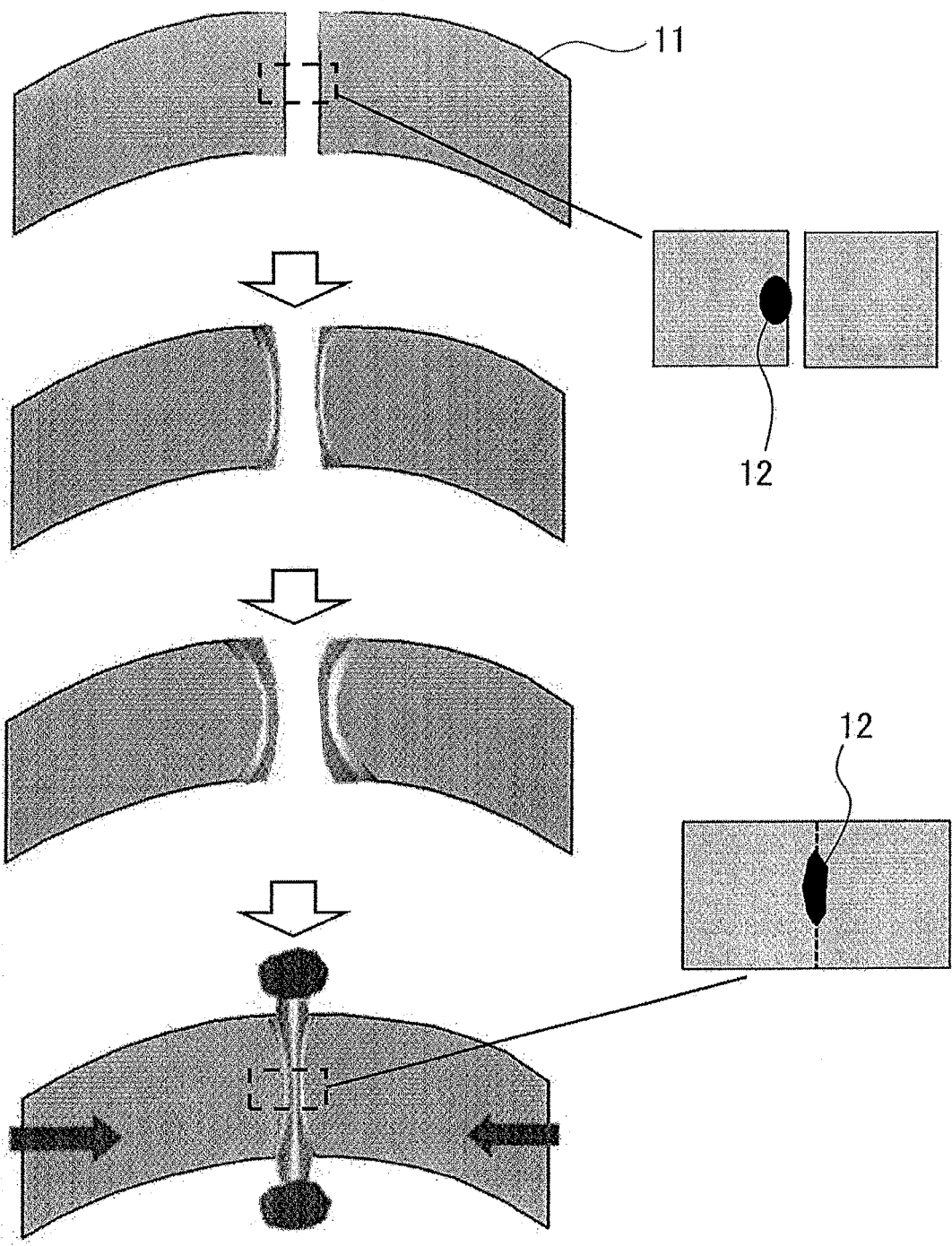
FIG. 1 is a view which schematically shows electric resistance welding of a conventional electric resistance welded steel pipe.
Figure 2:
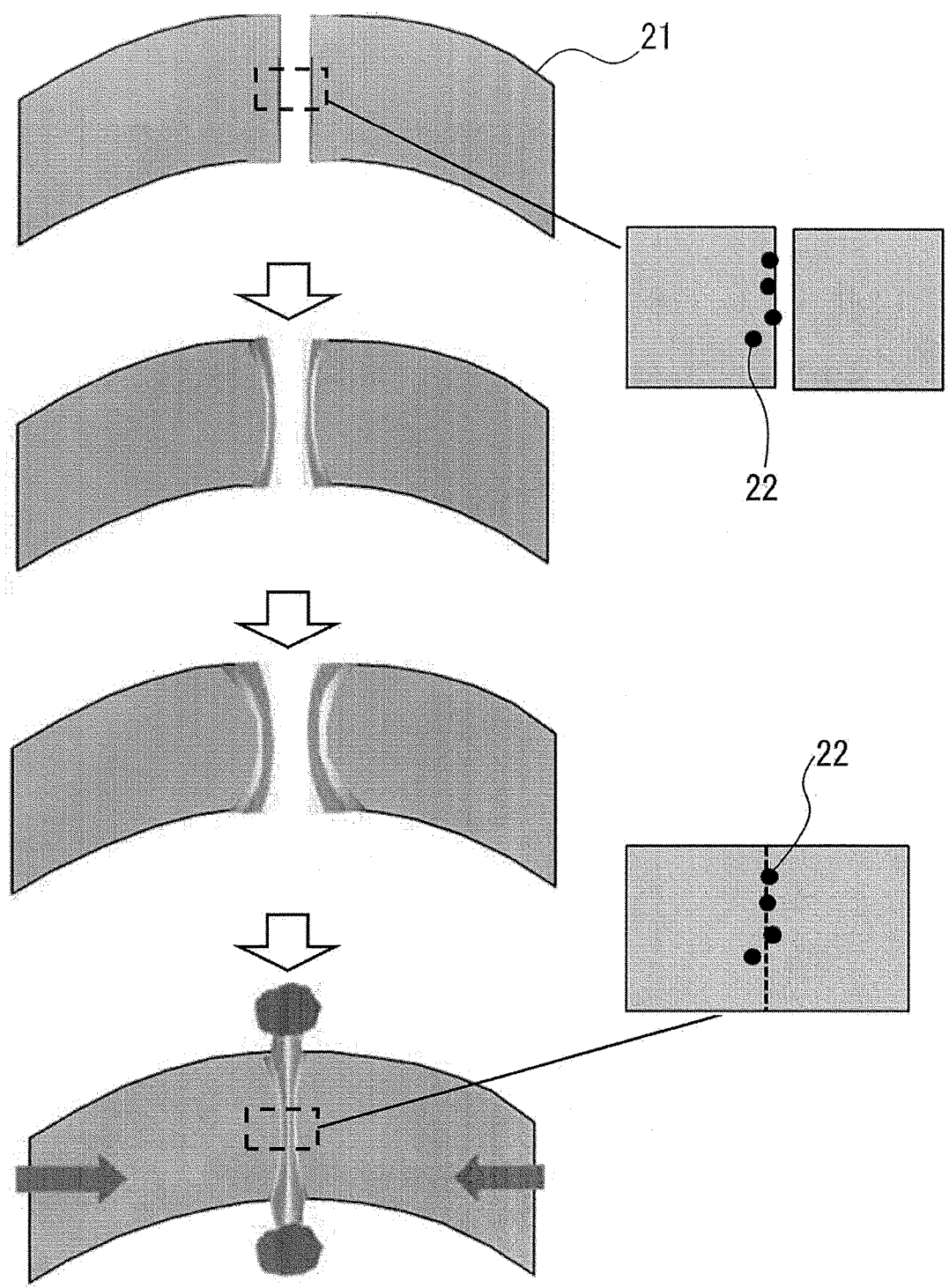
FIG. 2 is a view which shows an outline of electric resistance welding of electric resistance welded steel pipe according to the present invention.

Below, the present invention will be explained in detail. First, the chemical composition of the steel plate which forms the base metal of the electric resistance welded steel pipe of the present invention will be explained. Note that, in the chemical composition, the indication of "%" shall mean "mass %".

The electric resistance welded steel pipe of the present invention is suitable for oil country tubular goods and line pipe. Oil country tubular goods and line pipe are required to have different properties. Specifically, in oil country tubular goods, a high tensile strength is demanded, while in line pipe, a high low temperature toughness is demanded. For this reason, the preferable chemical compositions also differ in range. In the present invention, the target properties of oil country tubular goods are made a tensile strength of the base metal of 860 MPa or more, a base metal toughness at 0° C. of 100 J or more, and a weld zone toughness at 0° C. of 40 J or more, while the target properties of line pipe are made a tensile strength of the base metal of 500 MPa to 620 MPa, a base metal toughness at −40° C. of 100 J or more, and a weld zone toughness at −40° C. of 100 J or more. Below, these will be explained together with the ranges of the preferable chemical compositions.

C: 0.03 to 0.15%

C raises the hardenability and further causes the precipitation of carbides to thereby raise the strength of the hot rolled steel plate. Furthermore, it improves the strength utilizing the work hardening in the cold pipemaking process and is an important element for securing toughness. The content of C is made 0.03% or more to raise the hardenability and secure the strength. If the content of C is too great, the toughness deteriorates and the yield strength is also liable to fall, so the content of C is made 0.15% or less.

To obtain properties suitable for oil country tubular goods, the content of C is preferably made 0.06 to 0.15%. From the viewpoint of the balance of the toughness and strength, 0.07 to 0.12% is more preferable. To obtain properties suitable for line pipe, the content of C is preferably made 0.03 to 0.12%. From the viewpoint of the balance of the toughness and strength, 0.04 to 0.08% is more preferable.

Si: 0.1 to 0.3%

Si is an element useful for deoxidation or improvement of strength. The content of Si is made 0.1% or more so as to sufficiently secure the effect of deoxidation, so is made 0.1% or more. If the content of Si is too great, the toughness or weldability deteriorates, so the content of Si is made 0.3% or less.

Mn: 0.5 to 2.0%

Mn is an element which improves the hardenability and is useful for securing strength. The content of Mn is made 0.5% or more so as to sufficiently exhibit the effect of improvement of strength and low temperature toughness. If the content of Mn is too great, in the same way as Si, the toughness and the weldability are liable to deteriorate, so the content of Mn is made 2.0% or less.

To obtain properties suitable for oil country tubular goods, the content of Mn is preferably made 1.0 to 2.0%, more preferably 1.5 to 2.0%. To obtain properties suitable for line pipe, the content of Mn is preferably made 0.5 to 1.6%, more preferably 1.0 to 1.6%.

Al: 0.01 to 0.06%

Al is an element which is usually added in a steel material as a deoxidizing agent. If the content of Al exceeds 0.06%, the Al-based nonmetallic inclusions increase to harm the cleanliness of the steel materials and cause the toughness to possibly deteriorate, so the upper limit of the content is made 0.06%. To obtain properties suitable for line pipe, the content is preferably made 0.02% or more. If considering the balance between securing a stable deoxidizing effect and toughness, the content of Al is preferably made 0.04% or less.

Ti: 0.011 to 0.023%

Ti forms fine TiN and suppresses coarsening of austenite grains of the electric resistance weld zone at the time of reheating the slab to thereby contribute to refining of the microstructure. Further, when B is added, it immobilizes the dissolved N as TiN to suppress the formation of BN and is effective for securing the dissolved B contributing to improvement of the hardenability. To obtain these effects, the content of Ti is made 0.011% or more. If the content of Ti is too great, coarse TiN and TiC form and the toughness is liable to deteriorate, so the content of Ti is made 0.023% or less.

Ca: 0.0010 to 0.0050%

Ca is an element which controls the form of the sulfide-based inclusions and improves the low temperature toughness. If the content of Ca exceeds 0.0050%, CaO—CaS form large clusters or inclusions and are liable to detrimentally affect the toughness, so the content of Ca is made 0.0050% or less. By making the S concentration in the molten steel the later explained range, then treating the steel by Ca, it is possible to obtain a steel slab which is provided with SSC resistance and low temperature toughness. To obtain this effect, the content of Ca is made 0.0010% or more.

Total of One or More of Ce and La: 0.001 to 0.005%

Ce and/or La are elements which suppress the formation of stretched $CaOAl_2O_3$ and are extremely important elements in the present invention. To obtain this effect, the total of the contents of one or both of Ce and La is made 0.0010% or more. If the content exceeds 0.005%, the elements precipitate due to high temperature at the time of solidification, so become coarse inclusions. The austenite crystal grains coarsen and, further, become the cause of various defects inside the steel material, so the total of the contents of one or both of Ce and La is made 0.005% or less.

The steel plate which forms the base metal of the electric resistance welded steel pipe of the present invention further contains one or more of Nb, V, Mo, and B.

Nb: 0.1% or Less

Nb is an element which improves the hardenability and suppresses recrystallization of austenite at the time of hot rolling so as to refine the structure. If the content of Nb is too great, coarse precipitates are formed and the toughness is liable to deteriorate, so the content of Nb is made 0.10% or less. To obtain properties suitable for line pipe, the content of Nb is preferably made 0.01 to 0.06%.

V: 0.1% or Less

V has an effect substantially similar to Nb, but the effect is lower compared with Nb. Further, V also has the effect of suppressing softening of the weld zone. The content of V is made 0.1% or less from the viewpoint of the toughness of the electric resistance weld zone and field weldability.

Mo: 0.2% or Less

Mo is an element which improves the hardenability of the steel material and raises the strength. Further, Mo becomes copresent with Nb to suppress recrystallization of austenite at the time of rolling and contributes to refinement of the austenite structure. Mo is an expensive element. If Mo is excessively added, the economic efficiency is detracted. Therefore, the content of Mo is made 0.2% or less, preferably 0.1% or less, more preferably 0.05% or less.

B: 0.002% or Less

B is an element which secures the hardenability and improves the strength. Further, B segregates at the grain boundaries at the time of quenching to cause a drop in the grain boundary energy and contributes to improvement of the hardenability even with addition of a trace amount. If the content of B is too great, the hardenability becomes saturated and the mechanical properties vary and the toughness is liable to deteriorate, so the upper limit of the content of B is made 0.0020%.

Note that, to obtain properties suitable for line pipe, to secure higher low temperature toughness, Nb is preferably contained. Further, if B is contained, the field weldability, which is one of the properties generally demanded from line pipe, deteriorates, so the steel pipe which is used for line pipe is often made to contain B.

In steelmaking, chemical components which are contained in the raw materials or which enter in the process of production are mixed in unavoidably as impurities. Among these elements, P, S, O, and N are as follows and have to be particularly limited in content.

P: 0.03% or Less

P is an element which causes the low temperature toughness to degrade. It is preferred that the content is smaller. From the balance of costs and properties at the steelmaking stage, the content of P is made 0.03% or less. The content of P may also be made 0%, but it is actually impossible to make it 0% and becomes over 0%. The practical lower limit becomes 0.002% or so.

S: 0.0015% or Less

S forms MnS and causes the toughness to drop. By decreasing the content of S, the MnS is decreased and the toughness can be improved. From the balance of costs and properties at the steelmaking stage, the content of S is made 0.0015% or less. The content of S may also be 0%, but it is actually impossible to make it 0% and becomes over 0%. The practical lower limit becomes 0.0003% or so.

O: 0.002% or Less

If the content of 0 becomes greater, coarse Ca or Al or other oxides are formed and the HIC resistance and toughness deteriorate. It is preferred that the content of 0 is smaller. From the balance of costs and properties at the steelmaking stage, the content of 0 is made 0.002% or less. The content of O may also be 0%, but actually making it 0% is impossible and it becomes over 0%. The practical lower limit becomes 0.0003% or so.

N: 0.005% or Less

If the content of N becomes greater, TiN excessively increases and surface defects, deterioration of toughness, and other trouble is liable to occur. Further, when B is contained, it bonds with B to create BN and the amount of solid solution B which effectively acts for hardenability. From the balance of costs and properties at the steelmaking stage, the content of N is made 0.005% or less. The content of N may also be 0%, but actually making it 0% is impossible and it becomes over 0%. However, if fine TiN is formed in the steel, at the time of slab reheating, coarsening of austenite grains at the electric resistance weld zone is suppressed, the microstructure becomes finer, and the low temperature toughness of the base metal and electric resistance weld zone is improved, so the content of N is preferably made 0.0005% or more.

Note that, the content of S does not actually become 0%, so the inclusions basically become XCaAlOS. If the content of S is extremely small, part of the inclusions can become XCaAlO (X is Ce or La). In this case as well, a similar effect as when the inclusions become XCaAlOS can be expected, so the content of S is at least nonproblematic. Further, if the content of S or O is small, inclusions are harder to form, so there is no detrimental effect on the toughness of the electric resistance weld zone.

Furthermore, one or more of elements which improve the strength of the steel and improve the hardenability of the steel steel such as Cu, Ni, Cr, and Zr may be included as necessary.

Cu: 0.1 to 2%

Cu contributes to precipitation strengthening of ferrite and improvement of the fatigue strength and can be included in accordance with need to secure the strength of the steel plate. To obtain his effect, the content of Cu is made 0.1% or more. If the content of Cu is too great, the strength-ductility balance deteriorates, so the content of Cu is made 2% or less. Preferably, it is 0.6% or less.

Ni: 0.05 to 1%

Ni contributes to solution strength of the ferrite and can be included in accordance with need to secure the strength of the steel plate. To obtain his effect, the content of N is made 0.05%. If the content of Ni is too great, the strength-ductility balance deteriorates, so the content of Ni is made 1% or less. Preferably, it is 0.3% or less.

Cr: 0.01 to 1%

Cr is added in accordance with need to secure the strength of the steel plate. To obtain this effect, the content of Cr is made 0.01% or more. If the content of Cr becomes greater, the strength-ductility balance deteriorates, so the content of Cr is made 1% or less. Preferably, it is 0.5%.

Zr: 0.001 to 0.01%

Zr makes the sulfides spherical to improve the toughness of the base metal. To obtain this effect, the content of Zr is made 0.001% or more. If the content of Zr becomes greater, the cleanliness of the steel is impaired and the ductility deteriorates, so the content of Zr is made 0.01% or less.

The balance other than what is explained above consists of iron and unavoidable impurities. The "unavoidable impurities" are chemical components which are contained in the raw materials or which are mixed into the steel in the process of production and are not deliberately included in the steel.

Specifically, P, S, O, N, Sb, Sn, W, Co, As, Mg, Pb, Bi, and H may be mentioned. Among these, P, S, O, and N, as explained above, have to be controlled to give P: 0.03% or less, S: 0.0015% or less, O: 0.002% or less, and N: 0.005% or less.

As for other elements, usually, Sb, Sn, W, Co, and As may be contained in 0.1% or less, Mg, Pb, and Bi in 0.005% or less, and H in 0.0005% or less as unavoidable impurities, but if in the usual ranges, do not particularly have to be controlled.

Further, the selective or optional additive elements in the steel pipe of the present invention of Nb, V, Mo, B, Cu, Ni, Cr, and Zr may also be contained as unavoidable impurities even if not intentionally included, but so long as not more than the upper limits of the contents in the case where intentionally included, do not have a detrimental effect on the electric resistance welded steel pipe of the present invention even if less than the lower limits, so do not pose problems.

Furthermore, in the present invention, the contents of Ca, O, S, Ce, La, and Al have to satisfy the following formula (1):

$$XCASO = \left(\frac{Ca}{O} + \frac{Ca}{S} + 0.285\frac{Ce+La}{O} + 0.285\frac{Ce+La}{S}\right) \times \left(\frac{Al}{Ca}\right) > 78 \quad (1)$$

$$\left(\frac{Ca}{O} + \frac{Ca}{S} + 0.285\frac{Ce+La}{O} + 0.285\frac{Ce+La}{S}\right)$$

expresses the ability to trap O or S as inclusions by Ca, Ce, and La. The coefficient 0.285 is a numerical value close to the ratio of atomic weights of Ca and Ce or La of Ca/La=0.289 or Ca/Ce=0.286 and rounded off to facilitate calculation of the formula. Further, $$\left(\frac{Al}{Ca}\right)$$

is the ratio of composition of $CaOAl_2O_3$ and means the degree of the melting point of the inclusions. When the product of the two, that is, the XCASO value, is small, it shows that the untrapped inclusion-forming elements precipitate at a low temperature and, if the melting point is low, that these inclusions are easily stretched.

By making the XCASO of formula (1) over 78, when rolling a steel slab and welding it by electric resistance welding such as shown in FIG. 3, the long axis/short axis of inclusions (=aspect ratio) which are present at the electric resistance weld zone can be suppressed to 2.5 or less. As a result, as explained later, the toughness of the electric resistance weld zone can be made a level which is demanded to be achieved by many users. Specifically, when making the chemical composition one suitable for an oil country tubular goods, the toughness of the electric resistance weld zone at 0° C. can be made 40 J or more, while when making the chemical composition one suitable for a line pipe, the toughness of the electric resistance weld zone at −40° C. can be made 100 J or more.

That is, by making XCASO over 78, the "problem of remaining mCaO.nAl$_2$O$_3$ deformed in plate shapes" which had been a problem in conventional electric resistance weld zones is eliminated and it is possible to avoid a drop in toughness of the electric resistance weld zone due to residual mCaO.nAl$_2$O$_3$.

Figure 5:
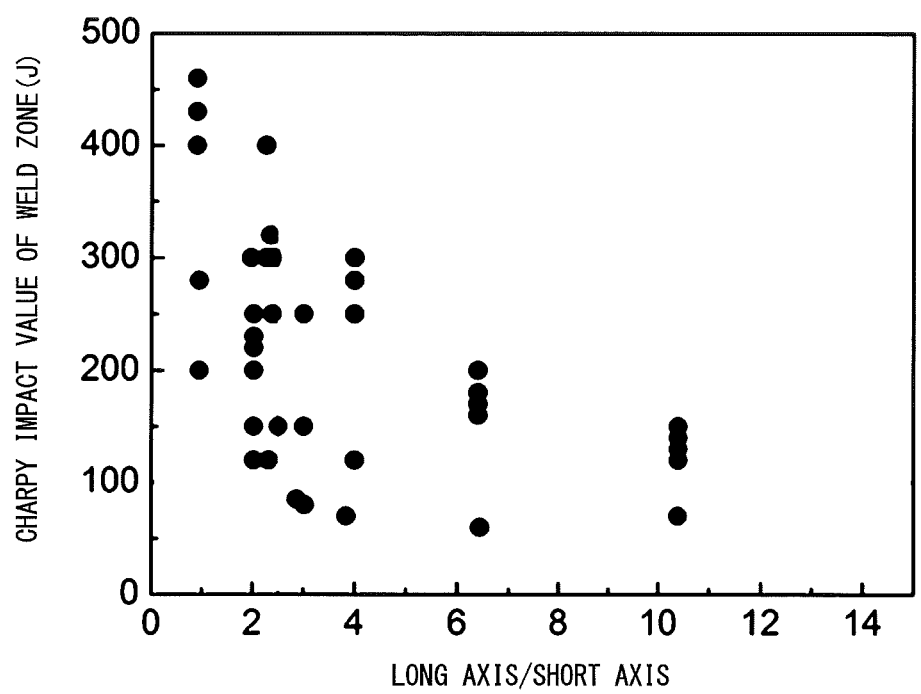
FIG. 5 is a graph which shows the long axis/short axis of inclusions and the Charpy impact value of the weld zone at 0° C. in particular of the electric resistance welded steel pipe suitable for line pipe.

As easily understood from FIGS. 3 to 5, if XCASO is less than 78, the long axis/short axis of inclusions exceeds 2.5. In this case, due to the stretched inclusions, the Charpy impact value (toughness) of the weld zone falls to less than the target value, that is, to less than 40 J in the case of an oil country tubular goods and to less than 100 J in the case of a line pipe. If the XCASO value exceeds 78, the long axis/short axis becomes 2.5 or less and the Charpy impact value of the weld zone is improved.

The long axis/short axis ratio is the maximum value of inclusions when observing by an SEM the cross-section of a weld zone without corrosion and after polishing. Specifically, for the SEM, a JSM-7001 made by JEOL, while for the EDS, the same EX-64175JMU was used. Further, for the analysis software, particle analysis of Analysis Station (Ver-.JED-2200) was used. Regions in a 1000× image judged to have a circle equivalent diameter of 0.5 nm to 100 um (maximum value in 1000× field) were defined as "inclusions". The locations observed were increased until the number of inclusions judged by this technique became 50 or more. The greater the number of inclusions evaluated, the higher the precision, but an excessive number leads to increase of the measurement time, so the maximum number was made 100.

Note that, making the contents of O and S zero is not practical, but even if the content of O or S falls below the measurement limit and is measured as 0, if O=0 or S=0 in formula (1), XCASO becomes ∞, so it is judged that XCASO>78 is satisfied.

In the case of electric resistance welded steel pipe which can be used as oil country tubular goods, the environments of use are becoming increasingly harsher. In addition to the above-mentioned weld zone toughness being 40 J or more at 0° C., it is important that the tensile strength of the base metal be 860 MPa or more and the base metal toughness at 0° C. be 100 J or more so as to be positioned as high strength steel pipe.

In the case of electric resistance welded steel pipe which can be used as line pipe, in addition to the above-mentioned weld zone toughness being 100 J or more at −40° C., it is important that the tensile strength of the base metal be 500 MPa or more and the base metal toughness at −40° C. be 100 J or more.

Below, the method of production of the electric resistance welded steel pipe of the present invention will be explained. To satisfy not only the toughness of the weld zone, but also the tensile strength and toughness of the base metal, it is preferable to make the cooling speed of the hot rolled steel plate or the coiling temperature the condition which is explained below.

First, in the refining process of the steelmaking, the chemical composition of the molten steel other than the Ce, La, and Ca is adjusted to a predetermined chemical composition. After this, at least one of Ce and La is added, then Ca is added. This is because if first adding Ca, inclusions of mCaO.nAl$_2$O$_3$ are formed, inclusions of XCaAlOS containing Ce or La having a predetermined long axis/short axis can no longer be finely dispersed, and, as a result, a drop in toughness of the electric resistance weld zone can no longer be avoided.

Next, the steel slab was heated, hot rolled, coiled, and made hot rolled steel plate, then this hot rolled steel plate was shaped into a tube and the abutting faces were welded by electric resistance welding to obtain electric resistance welded steel pipe. To adjust the circularity and the outside diameter of the electric resistance welded steel pipe, the steel may also be sized cold.

The heating temperature before hot rolling is made 1000 to 1280° C., more preferably 1050 to 1250° C., to cause the carbides to sufficiently dissolve and prevent coarsening of the crystal grains. Due to this, it is possible to sufficiently secure strength and obtain the necessary yield ratio.

The rolling end temperature after hot rolling is preferably 750 to 950° C. in range. Performing the hot rolling in this temperature range is preferable. If the rolling end temperature is too high, coarsening of the crystal grains is liable to cause a drop in toughness of the hot rolled steel plate. For this reason, the rolling end temperature is preferably 950° C. or less. If the rolling end temperature is too low, the hardenability becomes low, so the rolling end temperature is preferably 750° C. or more. The thickness of the steel plate after hot rolling is not limited, but 4.5 to 19 mm in range is particularly effective. In the case of application to oil country tubular goods, 7.5 to 15 mm in range is further effective.

After the end of hot rolling, preferably the steel is cooled on an accelerated basis by a 15 to 50° C./s cooling speed then is coiled to obtain hot rolled steel plate. The upper and lower limits of the cooling speed are preferably made the above range from the viewpoint of the productivity and economy, but are not restricted to this. The cooling speed is made the average speed at the center of thickness of the steel slab. The temperatures are found as the average temperature of the steel slab by calculation of heat conduction etc. The structure of the steel plate in the present embodiment is not particularly limited.

To obtain the 860 MPa or more tensile strength suitable for oil country tubular goods, the steel is made to transform at a low temperature. To prevent soaking and tempering due to coiling, the coiling temperature is preferably made 300° C. or less.

To obtain the 500 or more tensile strength suitable for line pipe, coarsening due to coiling is prevented from occurring, so the coiling temperature is preferably made 650° C. or less. Further, if the strength is too high, the sour resistance falls, so the coiling temperature is preferably made over 300° C.

Next, the obtained hot rolled steel plate is shaped into a tube and the abutting faces are welded by electric resistance welding to obtain electric resistance welded steel pipe. When shaping the hot rolled steel plate into a tube form, it is sufficient to continuously shape hot rolled steel plate to an open pipe. A known shaping method may be used. The shaping method is not particularly limited. Further, when welding by electric resistance welding, welding means may be used to heat the ends of the open pipe in the circumferential direction and the heated ends may be made to abut against each other and be press bonded. As the welding method, either of the known electric resistance welding method using high frequency current or the induction heating welding method may be applied. It is not particularly limited.

Electric resistance welded steel pipe with abutting ends in the circumferential direction of the open pipe welded together is preferably next ground to remove the bead which was formed at the weld zone, then is heat treated by high frequency current to heat it to the austenite region. By heating the seam by high frequency heat treatment, the hardness of the weld zone can be controlled and the toughness of the weld zone can be prevented from deteriorating. After heating the seam, water cooling etc. may be used for accelerated cooling.

After heating the seam, the electric resistance welded steel pipe may be sized cold. This "sizing" is a process of using a plurality of sizing rolls to finish the electric resistance welded steel pipe to a constant diameter and circularity. The produced electric resistance welded steel pipe is cut by a cutting machine into predetermined lengths.

By performing the pipemaking process cold, it is possible to cause work hardening and possible to raise the crushing strength of the electric resistance welded steel pipe.

EXAMPLES

Example 1

Steels of the compositions which are shown in Tables 1 and 2 were smelted after adding Ca, Ce, and La in the order shown in Table 3, then continuously cast into steel slabs. These were hot rolled under the conditions of Table 3 to obtain thickness 9.5 mm steel plate. These were further used to produce electric resistance welded steel pipes under the conditions of Table 4. In Table 1, "T.O" is the amount of O of the total of the O which forms solid solutions in the steel and O in the inclusions. From the obtained electric resistance welded steel pipes, full thickness tensile test pieces were taken from the L directions of the base metals and Charpy test pieces (JIS Z 2202 V notch standard dimensions) were taken from the C directions of the base metals and weld zones. The obtained test pieces were used to measure the tensile strengths and toughnesses of the base metals and, further, the toughnesses of the weld zones, the weld defect rates, and the long axis/short axis of inclusions.

The results are shown in Table 5. In the examples, the chemical compositions and coiling temperatures were made ranges suitable for oil country tubular goods, so tensile strengths of the base metals of 860 MPa or more, base metal toughnesses at 0° C. of 100 J or more, and weld zone toughnesses at 0° C. of 40 J or more were made target properties.

The Charpy impact test for measuring the weld defect area ratio is performed at 160° C. The toughness of the weld zone is affected not only by inclusions and structure, but also be the welding which occurs at the time of welding. At this test temperature, the parts with defects form brittle fracture surfaces, while the parts with no defects form ductile fracture surfaces. The fractured surfaces after the Charpy test were photographed and the areas of the individual brittle fracture surfaces were measured by image processing software. The average value of the ratios of the areas of the brittle fracture surfaces to the total surface parts of the fractures was evaluated by the weld defect area ratio for n=10 samples. Samples with a weld defect area ratio of 0.05% or less were evaluated as "good" and ones with over 0.05% were evaluated as poor. This 0.05% is a value corresponding to the test results on the level of inclusions in the steel plate of the base metal.

When the compositions of the steel materials and coiling temperatures were in ranges suitable for oil country tubular goods and when the XCASO was over 78 and the order of charging in the refining process was (other than Ca, Ce, La)→(Ce and La)→Ca, it was confirmed that steel pipes with tensile strengths of the base metals of 860 MPa, base metal toughnesses at −0° C. of 100 J or more, and weld zone toughnesses at 0° C. of 40 J or more were obtained.

TABLE 1

| | Steel no. | C | Si | Mn | P | S | T•O | N | Al | Ti | Ca |
|---|---|---|---|---|---|---|---|---|---|---|---|
| Inv. ex. | 1 | 0.08 | 0.25 | 1.90 | 0.011 | 0.0012 | 0.0014 | 0.0030 | 0.035 | 0.015 | 0.0018 |
| | 2 | 0.08 | 0.25 | 1.90 | 0.011 | 0.0012 | 0.0014 | 0.0030 | 0.035 | 0.015 | 0.0018 |
| | 3 | 0.08 | 0.25 | 1.90 | 0.011 | 0.0012 | 0.0016 | 0.0030 | 0.035 | 0.015 | 0.0018 |
| | 4 | 0.07 | 0.25 | 1.60 | 0.011 | 0.0012 | 0.0014 | 0.0030 | 0.035 | 0.015 | 0.0020 |
| | 5 | 0.12 | 0.24 | 1.90 | 0.016 | 0.0010 | 0.0015 | 0.0031 | 0.035 | 0.015 | 0.0020 |
| | 6 | 0.12 | 0.24 | 1.90 | 0.016 | 0.0010 | 0.0015 | 0.0031 | 0.035 | 0.015 | 0.0020 |
| | 7 | 0.12 | 0.24 | 1.90 | 0.016 | 0.0012 | 0.0015 | 0.0031 | 0.035 | 0.015 | 0.0020 |
| | 8 | 0.12 | 0.24 | 1.90 | 0.016 | 0.0010 | 0.0015 | 0.0031 | 0.035 | 0.015 | 0.0020 |
| | 9 | 0.12 | 0.24 | 1.90 | 0.016 | 0.0010 | 0.0015 | 0.0031 | 0.035 | 0.015 | 0.0020 |
| | 10 | 0.08 | 0.25 | 1.60 | 0.016 | 0.0008 | 0.0014 | 0.0035 | 0.035 | 0.017 | 0.0014 |
| | 11 | 0.03 | 0.24 | 1.60 | 0.010 | 0.0013 | 0.0014 | 0.0033 | 0.050 | 0.014 | 0.0014 |
| | 12 | 0.08 | 0.25 | 1.60 | 0.016 | 0.0008 | 0.0014 | 0.0040 | 0.035 | 0.017 | 0.0014 |
| Comp. ex. | 13 | 0.02 | 0.25 | 1.90 | 0.011 | 0.0012 | 0.0016 | 0.0030 | 0.035 | 0.015 | 0.0500 |
| | 14 | 0.16 | 0.25 | 1.90 | 0.011 | 0.0012 | 0.0016 | 0.0030 | 0.035 | 0.015 | 0.1600 |
| | 15 | 0.08 | 0.08 | 1.90 | 0.011 | 0.0012 | 0.0016 | 0.0030 | 0.035 | 0.015 | 0.0800 |
| | 16 | 0.08 | 0.50 | 1.90 | 0.011 | 0.0012 | 0.0016 | 0.0030 | 0.035 | 0.015 | 0.0800 |
| | 17 | 0.08 | 0.25 | 0.45 | 0.011 | 0.0012 | 0.0016 | 0.0030 | 0.035 | 0.015 | 0.0800 |
| | 18 | 0.08 | 0.25 | 2.20 | 0.011 | 0.0012 | 0.0016 | 0.0030 | 0.035 | 0.015 | 0.0800 |
| | 19 | 0.07 | 0.25 | 1.60 | 0.035 | 0.0012 | 0.0014 | 0.0030 | 0.035 | 0.015 | 0.0020 |
| | 20 | 0.07 | 0.25 | 1.60 | 0.011 | 0.0016 | 0.0014 | 0.0030 | 0.035 | 0.015 | 0.0020 |
| | 21 | 0.07 | 0.25 | 1.60 | 0.011 | 0.0012 | 0.0021 | 0.0030 | 0.035 | 0.015 | 0.0020 |
| | 22 | 0.08 | 0.25 | 1.60 | 0.016 | 0.0008 | 0.0014 | 0.0060 | 0.035 | 0.017 | 0.0014 |
| | 23 | 0.08 | 0.25 | 1.90 | 0.011 | 0.0012 | 0.0016 | 0.0030 | 0.008 | 0.015 | 0.0800 |
| | 24 | 0.08 | 0.25 | 1.90 | 0.011 | 0.0012 | 0.0016 | 0.0030 | 0.070 | 0.015 | 0.0800 |
| | 25 | 0.08 | 0.25 | 1.60 | 0.016 | 0.0008 | 0.0014 | 0.0035 | 0.035 | 0.009 | 0.0014 |

TABLE 1-continued

| | Steel no. | Chemical composition | | | | | | | |
|---|---|---|---|---|---|---|---|---|---|
| | | Ce | La | Ce + La | XCASO | Nb | V | Mo | B |
| Inv. ex. | 1 | 0.0030 | 0.0010 | 0.0040 | 88.5 | 0.05 | 0.045 | | |
| | 2 | 0.0030 | 0.0000 | 0.0030 | 79.9 | 0.05 | 0.045 | | |
| | 3 | 0.0000 | 0.0040 | 0.0040 | 83.4 | 0.05 | 0.045 | | |
| | 4 | 0.0030 | 0.0015 | 0.0045 | 88.9 | 0.05 | 0.040 | 0.05 | |
| | 5 | 0.0030 | 0.0015 | 0.0045 | 95.7 | 0.05 | 0.040 | 0.04 | |
| | 6 | 0.0030 | 0.0015 | 0.0045 | 95.7 | 0.09 | | | |
| | 7 | 0.0030 | 0.0015 | 0.0045 | 86.2 | | 0.080 | | |
| | 8 | 0.0030 | 0.0015 | 0.0045 | 95.7 | | | 0.13 | |
| | 9 | 0.0030 | 0.0015 | 0.0045 | 95.7 | | | 0.09 | |
| | 10 | 0.0025 | 0.0005 | 0.0030 | 110.7 | | 0.05 | 0.05 | 0.0015 |
| | 11 | 0.0030 | 0.0005 | 0.0035 | 127.0 | 0.03 | | 0.05 | 0.0015 |
| | 12 | 0.0025 | 0.0005 | 0.0030 | 110.7 | | | | 0.0019 |
| Comp. ex. | 13 | 0.0025 | 0.0005 | 0.0030 | 51.9 | 0.05 | 0.045 | | |
| | 14 | 0.0025 | 0.0005 | 0.0030 | 51.3 | 0.05 | 0.045 | | |
| | 15 | 0.0025 | 0.0005 | 0.0030 | 51.6 | 0.05 | 0.045 | | |
| | 16 | 0.0025 | 0.0005 | 0.0030 | 51.6 | 0.05 | 0.045 | | |
| | 17 | 0.0025 | 0.0005 | 0.0030 | 51.6 | 0.05 | 0.045 | | |
| | 18 | 0.0025 | 0.0005 | 0.0030 | 51.6 | 0.05 | 0.045 | | |
| | 19 | 0.0030 | 0.0015 | 0.0045 | 88.9 | 0.03 | 0.040 | 0.05 | |
| | 20 | 0.0030 | 0.0015 | 0.0045 | 76.9 | 0.03 | 0.040 | 0.05 | |
| | 21 | 0.0030 | 0.0015 | 0.0045 | 75.2 | 0.03 | 0.040 | 0.05 | |
| | 22 | 0.0025 | 0.0005 | 0.0030 | 110.7 | 0.05 | | 0.04 | 0.0015 |
| | 23 | 0.0025 | 0.0005 | 0.0030 | 11.8 | 0.05 | 0.045 | | |
| | 24 | 0.0025 | 0.0005 | 0.0030 | 103.2 | 0.05 | 0.045 | | |
| | 25 | 0.0025 | 0.0005 | 0.0030 | 110.7 | 0.05 | | 0.04 | 0.0015 |

*Underlines mean outside scope of claims.

TABLE 2

Continuation of Table 1

| | Steel no. | Chemical composition | | | | | | | | |
|---|---|---|---|---|---|---|---|---|---|---|
| | | C | Si | Mn | P | S | T•O | N | Al | Ti |
| Comp. ex. | 26 | 0.08 | 0.25 | 1.60 | 0.016 | 0.0008 | 0.0014 | 0.0035 | 0.035 | 0.025 |
| | 27 | 0.08 | 0.25 | 1.90 | 0.011 | 0.0012 | 0.0016 | 0.0030 | 0.035 | 0.015 |
| | 28 | 0.08 | 0.25 | 1.90 | 0.011 | 0.0012 | 0.0016 | 0.0030 | 0.035 | 0.015 |
| | 29 | 0.08 | 0.25 | 1.90 | 0.011 | 0.0012 | 0.0016 | 0.0030 | 0.035 | 0.015 |
| | 30 | 0.08 | 0.25 | 1.90 | 0.011 | 0.0012 | 0.0016 | 0.0030 | 0.035 | 0.015 |
| | 31 | 0.08 | 0.25 | 1.90 | 0.011 | 0.0013 | 0.0017 | 0.0030 | 0.030 | 0.015 |
| | 32 | 0.07 | 0.25 | 1.60 | 0.011 | 0.0012 | 0.0014 | 0.0030 | 0.035 | 0.015 |
| | 33 | 0.07 | 0.25 | 1.60 | 0.011 | 0.0012 | 0.0014 | 0.0030 | 0.035 | 0.015 |
| | 34 | 0.07 | 0.25 | 1.60 | 0.011 | 0.0012 | 0.0014 | 0.0030 | 0.035 | 0.015 |
| | 35 | 0.08 | 0.25 | 1.60 | 0.016 | 0.0008 | 0.0014 | 0.0040 | 0.035 | 0.017 |
| | 36 | 0.07 | 0.25 | 1.60 | 0.011 | 0.0012 | 0.0014 | 0.0030 | 0.035 | 0.015 |
| | 37 | 0.08 | 0.25 | 1.90 | 0.011 | 0.0012 | 0.0014 | 0.0030 | 0.035 | 0.015 |
| | 38 | 0.08 | 0.25 | 1.90 | 0.011 | 0.0012 | 0.0014 | 0.0030 | 0.035 | 0.015 |
| | 39 | 0.08 | 0.25 | 1.90 | 0.011 | 0.0012 | 0.0014 | 0.0030 | 0.035 | 0.015 |
| | 40 | 0.08 | 0.25 | 1.90 | 0.011 | 0.0012 | 0.0014 | 0.0030 | 0.035 | 0.015 |
| | 41 | 0.08 | 0.25 | 1.90 | 0.011 | 0.0012 | 0.0014 | 0.0030 | 0.035 | 0.015 |

| | Steel no. | Chemical composition | | | | | | | | |
|---|---|---|---|---|---|---|---|---|---|---|
| | | Ca | Ce | La | Ce + La | XCASO | Nb | V | Mo | B |
| Comp. ex. | 26 | 0.0014 | 0.0025 | 0.0005 | 0.0030 | 110.7 | 0.05 | | 0.04 | 0.0015 |
| | 27 | 0.0009 | 0.0030 | 0.0010 | 0.0040 | 115.7 | 0.05 | 0.045 | | |
| | 28 | 0.0040 | 0.0030 | 0.0010 | 0.0040 | 65.6 | 0.05 | 0.045 | | |
| | 29 | 0.0018 | 0.0002 | 0.0001 | 0.0003 | 53.5 | 0.05 | 0.045 | | |
| | 30 | 0.0018 | 0.0050 | 0.0010 | 0.0060 | 99.5 | 0.05 | 0.045 | | |
| | 31 | 0.0035 | 0.0030 | 0.0010 | 0.0040 | 54.0 | 0.05 | 0.045 | | |
| | 32 | 0.0020 | 0.0030 | 0.0015 | 0.0045 | 88.9 | 0.11 | 0.040 | 0.05 | |
| | 33 | 0.0020 | 0.0030 | 0.0015 | 0.0045 | 88.9 | 0.03 | 0.110 | 0.05 | |
| | 34 | 0.0020 | 0.0030 | 0.0015 | 0.0045 | 88.9 | 0.03 | 0.040 | 0.21 | |
| | 35 | 0.0014 | 0.0025 | 0.0005 | 0.0030 | 110.7 | 0.05 | | 0.04 | 0.0025 |
| | 36 | 0.0020 | 0.0030 | 0.0015 | 0.0045 | 88.9 | 0 | 0.000 | 0 | 0.0000 |
| | 37 | 0.0018 | 0.0030 | 0.0010 | 0.0040 | 88.5 | 0.05 | 0.045 | | |
| | 38 | 0.0018 | 0.0000 | 0.0000 | 0.0000 | 54.2 | 0.05 | | | |
| | 39 | 0.0018 | 0.0000 | 0.0000 | 0.0000 | 54.2 | 0.05 | 0.045 | | |

TABLE 2-continued

Continuation of Table 1

| | | | | | | | | | |
|---|---|---|---|---|---|---|---|---|---|
| 40 | 0.0018 | 0.0000 | 0.0000 | 0.0000 | 54.2 | 0.05 | 0.045 | 0.05 | |
| 41 | 0.0018 | 0.0000 | 0.0000 | 0.0000 | 54.2 | 0.05 | 0.045 | 0.05 | 0.0012 |

*Underlines mean outside scope of claims.

TABLE 3

| Steel no. | Order of charging additive elements | Heating temperature (° C.) | Final rolling completion temperature (° C.) | Cooling speed after final rolling (° C./sec) | Coiling temperature (° C.) |
|---|---|---|---|---|---|
| 1 | (Ce + La) →Ca | 1250 | 950 | 35 | 250° C. |
| 2 | (Ce) →Ca | 1250 | 950 | 35 | 250° C. |
| 3 | (La) →Ca | 1250 | 950 | 35 | 250° C. |
| 4 | (Ce + La) →Ca | 1250 | 950 | 35 | 250° C. |
| 5 | (Ce + La) →Ca | 1250 | 950 | 35 | 250° C. |
| 6 | (Ce + La) →Ca | 1250 | 950 | 35 | 250° C. |
| 7 | (Ce + La) →Ca | 1250 | 950 | 35 | 250° C. |
| 8 | (Ce + La) →Ca | 1250 | 950 | 35 | Room temp. |
| 9 | (Ce + La) →Ca | 1250 | 950 | 35 | 250° C. |
| 10 | (Ce + La) →Ca | 1250 | 950 | 35 | Room temp. |
| 11 | (Ce + La) →Ca | 1250 | 950 | 35 | Room temp. |
| 12 | (Ce + La) →Ca | 1250 | 950 | 35 | Room temp. |
| 13 | (Ce + La) →Ca | 1250 | 950 | 35 | Room temp. |
| 14 | (Ce + La) →Ca | 1250 | 950 | 35 | Room temp. |
| 15 | (Ce + La) →Ca | 1250 | 950 | 35 | Room temp. |
| 16 | (Ce + La) →Ca | 1250 | 950 | 35 | Room temp. |
| 17 | (Ce + La) →Ca | 1250 | 950 | 35 | Room temp. |
| 18 | (Ce + La) →Ca | 1250 | 950 | 35 | Room temp. |
| 19 | (Ce + La) →Ca | 1250 | 950 | 35 | Room temp. |
| 20 | (Ce + La) →Ca | 1250 | 950 | 35 | Room temp. |
| 21 | (Ce + La) →Ca | 1250 | 950 | 35 | Room temp. |
| 22 | (Ce + La) →Ca | 1250 | 950 | 35 | Room temp. |
| 23 | (Ce + La) →Ca | 1250 | 950 | 35 | Room temp. |
| 24 | (Ce + La) →Ca | 1250 | 950 | 35 | Room temp. |
| 25 | (Ce + La) →Ca | 1250 | 950 | 35 | Room temp. |
| 26 | (Ce + La) →Ca | 1250 | 950 | 35 | Room temp. |
| 27 | (Ce + La) →Ca | 1250 | 950 | 35 | Room temp. |
| 28 | (Ce + La) →Ca | 1250 | 950 | 35 | Room temp. |
| 29 | (Ce + La) →Ca | 1250 | 950 | 35 | Room temp. |
| 30 | (Ce + La) →Ca | 1250 | 950 | 35 | Room temp. |
| 31 | (Ce + La) →Ca | 1250 | 950 | 35 | 250° C. |
| 32 | (Ce + La) →Ca | 1250 | 950 | 35 | Room temp. |
| 33 | (Ce + La) →Ca | 1250 | 950 | 35 | Room temp. |
| 34 | (Ce + La) →Ca | 1250 | 950 | 35 | Room temp. |
| 35 | (Ce + La) →Ca | 1250 | 950 | 35 | Room temp. |
| 36 | (Ce + La) →Ca | 1250 | 950 | 35 | Room temp. |
| 37 | Ca→ (Ce + La) | 1250 | 950 | 35 | 250° C. |
| 38 | Ca | 1250 | 950 | 35 | 250° C. |
| 39 | Ca | 1250 | 950 | 35 | 250° C. |
| 40 | Ca | 1250 | 950 | 35 | 250° C. |
| 41 | Ca | 1250 | 950 | 35 | 250° C. |

TABLE 4

| | |
|---|---|
| Welded pipe diameter | φ140 mm |
| Welded pipe thickness | t9.5 mm |
| Amount of weld upset | 1/2t |
| Welding heat input | 1100 kW |
| Welding speed | 30 m/min |

TABLE 5

| | Quality | | | | | | |
|---|---|---|---|---|---|---|---|
| Steel no. | Base metal tensile strength (MPa) | Base metal toughness (J@0° C.) | Weld defect area ratio | Type of weld defect | Type of main inclusions | Weld zone toughness (J@0° C.) | Form of inclusions Long axis/ short axis |
| 1 | 950 | 110 | 0.02 | | XCaAlOS | 60 | 1.6 |
| 2 | 950 | 110 | 0.02 | | XCaAlOS | 60 | 2.2 |
| 3 | 950 | 110 | 0.02 | | XCaAlOS | 60 | 1.9 |
| 4 | 1000 | 105 | 0.02 | | XCaAlOS | 55 | 1.8 |
| 5 | 1000 | 105 | 0.02 | | XCaAlOS | 55 | 1.5 |
| 6 | 950 | 110 | 0.02 | | XCaAlOS | 60 | 1.5 |
| 7 | 950 | 110 | 0.02 | | XCaAlOS | 60 | 1.7 |
| 8 | 950 | 110 | 0.02 | | XCaAlOS | 60 | 1.4 |
| 9 | 950 | 110 | 0.02 | | XCaAlOS | 60 | 1.6 |
| 10 | 1200 | 100 | 0.01 | | XCaAlOS | 60 | 1.4 |
| 11 | 1150 | 108 | 0.01 | | XCaAlOS | 100 | 1.3 |
| 12 | 950 | 110 | 0.01 | | XCaAlOS | 100 | 1.4 |
| 13 | 780 | 120 | 0.02 | | XCaAlOS | 96 | 6.0 |
| 14 | — | — | — | | — | — | Cannotbe stablyproduced |
| 15 | 800 | 120 | 0.02 | | XCaAlOS | 110 | 6.1 |
| 16 | 950 | 110 | 0.30 | SiO$_2$ | XCaAlOS | 20 | 6.1 |
| 17 | 830 | 120 | 0.01 | | XCaAlOS | 110 | 6.1 |
| 18 | 950 | 110 | 0.10 | MnO | XCaAlOS | 30 | 6.1 |
| 19 | 1000 | 80 | 0.01 | | XCaAlOS | 70 | 1.6 |
| 20 | 1000 | 105 | 0.01 | | MnS | 35 | 2.6 |
| 21 | 1000 | 105 | 0.01 | | CaOAi2O3 | 38 | 2.8 |
| 22 | 830 | 105 | 0.01 | | XCaAlOS | 100 | 1.4 |
| 23 | 950 | 105 | 0.01 | | CaOAi2O3 | 100 | 10.0 |
| 24 | 950 | 105 | 0.15 | Al$_2$O$_3$ | XCaAlOS | 25 | 1.5 |

TABLE 5-continued

| | | | Quality | | | |
|---|---|---|---|---|---|---|
| Steel no. | Base metal tensile strength (MPa) | Base metal toughness (J@0° C.) | Weld defect area ratio | Type of weld defect | Type of main inclusions | Weld zone toughness (J@0° C.) | Form of inclusions Long axis/ short axis |
| 25 | 800 | 120 | 0.01 | | XCaAlOS | 100 | 1.4 |
| 26 | 1100 | 70 | 0.01 | | XCaAlOS | 105 | 1.4 |
| 27 | 950 | 110 | 0.02 | | XCaAlOS | 20 | 11.0 |
| 28 | 950 | 110 | 0.02 | | CaOAi2O3 | 38 | 4.1 |
| 29 | 950 | 110 | 0.02 | | CaOAi2O3 | 35 | 5.8 |
| 30 | — | — | — | | — | — | Cannot be stably produced |
| 31 | 950 | 110 | 0.02 | | CaOAi2O3 | 30 | 4.5 |
| 32 | 1200 | 80 | 0.01 | | XCaAlOS | 70 | 1.6 |
| 33 | 1200 | 70 | 0.01 | | XCaAlOS | 60 | 1.6 |
| 34 | 1200 | 80 | 0.01 | | XCaAlOS | 70 | 1.6 |
| 35 | 1150 | 50 | 0.01 | | XCaAlOS | 45 | 1.4 |
| 36 | 800 | 120 | 0.01 | | XCaAlOS | 110 | 1.6 |
| 37 | 950 | 110 | 0.02 | | CaOAi2O3 | 35 | 1.6 |
| 38 | 950 | 75 | 0.02 | | CaOAi2O3 | 35 | 6.1 |
| 39 | 980 | 70 | 0.02 | | CaOAi2O3 | 30 | 6.2 |
| 40 | 1030 | 60 | 0.02 | | CaOAi2O3 | 25 | 6.0 |
| 41 | 1150 | 50 | 0.02 | | CaOAi2O3 | 20 | 5.9 |

Example 2

Steels of the compositions which are shown in Tables 6 and 7 were smelted, then continuously cast into steel slabs. These were hot rolled under the conditions of Table 8 to obtain thickness 9.5 mm steel plate. These were further used to produce electric resistance welded steel pipes under the conditions of Table 9. From the obtained steel pipes, tensile test pieces were taken from the L directions of the base metals and Charpy test pieces (JIS Z 2202 V notch standard dimensions) were taken from the C directions of the base metals and weld zones. The obtained test pieces were used to measure the tensile strengths and toughnesses of the base metals and, further, the toughnesses of the weld zones, the weld defect rates, and the long axis/short axis of inclusions. The measurement methods are similar to Example 1.

The results are shown in Table 10. In the examples, the chemical compositions and coiling temperatures were made ranges suitable for line pipes, so tensile strengths of the base metals of 500 to 620 MPa, base metal toughnesses at −40° C. of 100 J or more, and weld zone toughnesses at −40° C. of 100 J or more were made target properties.

When the compositions of the steel materials and coiling temperatures were in ranges suitable for line pipe and when the XCASO was over 78 and the order of charging in the refining process was (other than Ca, Ce, La)→(Ce and La)→Ca, it was confirmed that steel pipes with tensile strengths of the base metals of 500 to 620 MPa, base metal toughnesses at −40° C. of 100 J or more, and weld zone toughnesses at −40° C. of 100 J or more were obtained.

TABLE 6

| | Steel no. | Chemical composition | | | | | | | | | | |
|---|---|---|---|---|---|---|---|---|---|---|---|---|
| | | C | Si | Mn | P | S | T•O | N | Al | Ti | Ca | Ce |
| Inv. ex. | 51 | 0.08 | 0.21 | 0.50 | 0.017 | 0.0010 | 0.0016 | 0.0030 | 0.035 | 0.015 | 0.0025 | 0.0028 |
| | 52 | 0.09 | 0.21 | 0.90 | 0.017 | 0.0010 | 0.0016 | 0.0030 | 0.035 | 0.015 | 0.0025 | 0.0035 |
| | 53 | 0.04 | 0.20 | 1.60 | 0.020 | 0.0012 | 0.0018 | 0.0035 | 0.040 | 0.015 | 0.0020 | 0.0030 |
| | 54 | 0.11 | 0.22 | 1.57 | 0.010 | 0.0011 | 0.0016 | 0.0033 | 0.042 | 0.016 | 0.0036 | 0.0000 |
| | 55 | 0.08 | 0.20 | 1.15 | 0.009 | 0.0009 | 0.0017 | 0.0039 | 0.050 | 0.015 | 0.0021 | 0.0035 |
| | 56 | 0.05 | 0.20 | 1.00 | 0.016 | 0.0012 | 0.0015 | 0.0031 | 0.035 | 0.015 | 0.0020 | 0.0030 |
| | 57 | 0.05 | 0.20 | 1.00 | 0.016 | 0.0012 | 0.0015 | 0.0031 | 0.035 | 0.015 | 0.0020 | 0.0030 |
| | 58 | 0.05 | 0.20 | 1.00 | 0.016 | 0.0012 | 0.0015 | 0.0031 | 0.035 | 0.015 | 0.0020 | 0.0030 |
| | 59 | 0.05 | 0.20 | 1.00 | 0.016 | 0.0012 | 0.0015 | 0.0031 | 0.035 | 0.015 | 0.0020 | 0.0030 |
| | 60 | 0.05 | 0.20 | 1.00 | 0.016 | 0.0012 | 0.0015 | 0.0031 | 0.035 | 0.015 | 0.0020 | 0.0030 |
| | 61 | 0.05 | 0.20 | 1.00 | 0.016 | 0.0012 | 0.0015 | 0.0031 | 0.035 | 0.015 | 0.0020 | 0.0030 |
| | 62 | 0.05 | 0.20 | 1.00 | 0.016 | 0.0012 | 0.0015 | 0.0031 | 0.035 | 0.015 | 0.0020 | 0.0030 |
| | 63 | 0.05 | 0.20 | 1.00 | 0.016 | 0.0012 | 0.0015 | 0.0031 | 0.035 | 0.015 | 0.0020 | 0.0030 |
| | 64 | 0.05 | 0.20 | 1.00 | 0.016 | 0.0012 | 0.0015 | 0.0031 | 0.035 | 0.015 | 0.0020 | 0.0030 |
| | 65 | 0.05 | 0.20 | 1.00 | 0.016 | 0.0012 | 0.0015 | 0.0031 | 0.035 | 0.015 | 0.0020 | 0.0030 |
| | 66 | 0.08 | 0.21 | 0.50 | 0.017 | 0.0010 | 0.0016 | 0.0030 | 0.035 | 0.015 | 0.0025 | 0.0028 |
| Comp. ex | 67 | 0.02 | 0.20 | 1.60 | 0.020 | 0.0012 | 0.0018 | 0.0035 | 0.040 | 0.015 | 0.0020 | 0.0030 |
| | 68 | 0.16 | 0.20 | 1.60 | 0.020 | 0.0012 | 0.0018 | 0.0035 | 0.040 | 0.015 | 0.0020 | 0.0030 |
| | 69 | 0.09 | 0.05 | 0.90 | 0.017 | 0.0010 | 0.0016 | 0.0030 | 0.035 | 0.015 | 0.0025 | 0.0025 |
| | 70 | 0.09 | 0.55 | 0.90 | 0.017 | 0.0010 | 0.0016 | 0.0030 | 0.035 | 0.015 | 0.0025 | 0.0025 |
| | 71 | 0.04 | 0.20 | 0.30 | 0.020 | 0.0012 | 0.0018 | 0.0035 | 0.040 | 0.015 | 0.0020 | 0.0023 |
| | 72 | 0.04 | 0.20 | 2.10 | 0.020 | 0.0012 | 0.0018 | 0.0035 | 0.040 | 0.015 | 0.0020 | 0.0023 |
| | 73 | 0.05 | 0.20 | 1.00 | 0.040 | 0.0012 | 0.0015 | 0.0031 | 0.035 | 0.015 | 0.0020 | 0.0030 |
| | 74 | 0.05 | 0.20 | 1.00 | 0.016 | 0.002 | 0.0015 | 0.0031 | 0.035 | 0.015 | 0.0020 | 0.0030 |
| | 75 | 0.05 | 0.20 | 1.00 | 0.016 | 0.0012 | 0.0025 | 0.0031 | 0.035 | 0.015 | 0.0020 | 0.0030 |

TABLE 6-continued

| | Steel no. | La | Ce + La | XCASO | Nb | V | Mo | B | Cu | Ni | Cr | Zr |
|---|---|---|---|---|---|---|---|---|---|---|---|---|
| Inv. ex. | 51 | 0.0010 | 0.0038 | 81.5 | 0.05 | | | | | | | |
| | 52 | 0.0000 | 0.0035 | 79.6 | 0.05 | | | | | | | |
| | 53 | 0.0010 | 0.0040 | 87.2 | 0.03 | | | | | | | |
| | 54 | 0.0032 | 0.0032 | 80.8 | 0.015 | | | | | | | |
| | 55 | 0.0000 | 0.0035 | 125.3 | 0.05 | | | | | | | |
| | 56 | 0.0015 | 0.0045 | 86.2 | 0.045 | | | | | | | |
| | 57 | 0.0015 | 0.0045 | 86.2 | 0.045 | 0.04 | | | | | | |
| | 58 | 0.0015 | 0.0045 | 86.2 | 0.045 | | 0.03 | | | | | |
| | 59 | 0.0015 | 0.0045 | 86.2 | 0.045 | | | | 1.0 | | | |
| | 60 | 0.0015 | 0.0045 | 86.2 | 0.045 | | | | | 1.00 | | |
| | 61 | 0.0015 | 0.0045 | 86.2 | 0.045 | | | | | | 0.20 | |
| | 62 | 0.0015 | 0.0045 | 86.2 | 0.045 | | | | | | | 0.050 |
| | 63 | 0.0015 | 0.0045 | 86.2 | 0.045 | 0.02 | 0.02 | | | | | |
| | 64 | 0.0015 | 0.0045 | 86.2 | 0.045 | 0.02 | | | | | 0.20 | |
| | 65 | 0.0015 | 0.0045 | 86.2 | 0.045 | | | | 0.5 | 0.50 | | |
| | 66 | 0.0010 | 0.0038 | 81.5 | 0.05 | | | | | | | |
| Comp. ex. | 67 | 0.0010 | 0.0040 | 87.2 | 0.030 | | | | | | | |
| | 68 | 0.0010 | 0.0040 | 87.2 | 0.030 | | | | | | | |
| | 69 | 0.0010 | 0.0035 | 79.6 | 0.050 | | | | | | | |
| | 70 | 0.0010 | 0.0035 | 79.6 | 0.050 | | | | | | | |
| | 71 | 0.0008 | 0.0031 | 80.1 | 0.030 | | | | | | | |
| | 72 | 0.0008 | 0.0031 | 80.1 | 0.030 | | | | | | | |
| | 73 | 0.0015 | 0.0045 | 86.2 | 0.045 | | | | | | | |
| | 74 | 0.0015 | 0.0045 | 74.2 | 0.045 | | | | | | | |
| | 75 | 0.0015 | 0.0045 | 70.8 | 0.045 | | | | | | | |

*Underlines mean outside scope of claims.

TABLE 7

Continuation of Table 6

| | Steel no. | C | Si | Mn | P | S | T•O | N | Al | Ti | Ca | Ce |
|---|---|---|---|---|---|---|---|---|---|---|---|---|
| Comp. ex. | 76 | 0.05 | 0.20 | 1.00 | 0.016 | 0.0012 | 0.0015 | 0.0070 | 0.035 | 0.015 | 0.0020 | 0.0030 |
| | 77 | 0.08 | 0.20 | 1.15 | 0.009 | 0.0009 | 0.0016 | 0.0039 | 0.008 | 0.015 | 0.0021 | 0.0035 |
| | 78 | 0.08 | 0.20 | 1.15 | 0.009 | 0.0009 | 0.0016 | 0.0039 | 0.070 | 0.015 | 0.0021 | 0.0035 |
| | 79 | 0.08 | 0.20 | 1.15 | 0.009 | 0.0009 | 0.0017 | 0.0039 | 0.050 | 0.008 | 0.0021 | 0.0035 |
| | 80 | 0.08 | 0.20 | 1.15 | 0.009 | 0.0009 | 0.0017 | 0.0039 | 0.050 | 0.025 | 0.0021 | 0.0035 |
| | 81 | 0.11 | 0.22 | 1.57 | 0.010 | 0.0014 | 0.0018 | 0.0033 | 0.035 | 0.016 | 0.0009 | 0.0015 |
| | 82 | 0.11 | 0.22 | 1.57 | 0.010 | 0.0014 | 0.0018 | 0.0033 | 0.035 | 0.016 | 0.0060 | 0.0015 |
| | 83 | 0.08 | 0.21 | 0.50 | 0.017 | 0.0010 | 0.0016 | 0.0030 | 0.035 | 0.015 | 0.0025 | 0.0009 |
| | 84 | 0.08 | 0.21 | 0.50 | 0.017 | 0.0010 | 0.0016 | 0.0030 | 0.035 | 0.015 | 0.0025 | 0.0040 |
| | 85 | 0.08 | 0.21 | 0.50 | 0.017 | 0.0012 | 0.0018 | 0.0030 | 0.035 | 0.015 | 0.0025 | 0.0030 |
| | 86 | 0.05 | 0.20 | 1.00 | 0.016 | 0.0012 | 0.0015 | 0.0031 | 0.035 | 0.015 | 0.0020 | 0.0030 |
| | 87 | 0.04 | 0.20 | 1.60 | 0.020 | 0.0012 | 0.0018 | 0.0035 | 0.040 | 0.015 | 0.0020 | 0.0030 |

| | Steel no. | La | Ce + La | XCASO | Nb | V | Mo | B | Cu | Ni | Cr | Zr |
|---|---|---|---|---|---|---|---|---|---|---|---|---|
| Comp. ex. | 76 | 0.0015 | 0.0045 | 86.2 | 0.045 | | | | | | | |
| | 77 | 0.0000 | 0.0035 | 38.4 | 0.050 | | | | | | | |
| | 78 | 0.0000 | 0.0035 | 179.3 | 0.050 | | | | | | | |
| | 79 | 0.0000 | 0.0035 | 125.3 | 0.050 | | | | | | | |
| | 80 | 0.0000 | 0.0035 | 125.3 | 0.050 | | | | | | | |
| | 81 | 0.0005 | 0.0020 | 72.6 | 0.015 | | | | | | | |
| | 82 | 0.0005 | 0.0020 | 48.7 | 0.015 | | | | | | | |
| | 83 | 0.0000 | 0.0009 | 62.8 | 0.050 | | | | | | | |
| | 84 | 0.0020 | 0.0060 | 95.8 | 0.050 | | | | | | | |
| | 85 | 0.0010 | 0.0040 | 70.8 | 0.050 | | | | | | | |
| | 86 | 0.0015 | 0.0045 | 86.2 | 0.110 | | | | | | | |
| | 87 | 0.0010 | 0.0040 | 87.2 | 0.03 | | | | | | | |

*Underlines mean outside scope of claims.

TABLE 8

| Steel no. | Order of charging additive elements | Heating temperature (° C.) | Final rolling completion temperature (° C.) | Cooling speed after final rolling (° C./sec) | Coiling temperature (° C.) |
|---|---|---|---|---|---|
| 51 | (Ce + La) →Ca | 1250 | 950 | 35 | 520 |
| 52 | (Ce + La) →Ca | 1250 | 950 | 35 | 520 |
| 53 | (Ce + La) →Ca | 1250 | 950 | 35 | 530 |
| 54 | (Ce + La) →Ca | 1250 | 950 | 35 | 530 |
| 55 | (Ce + La) →Ca | 1250 | 950 | 35 | 550 |
| 56 | (Ce + La) →Ca | 1250 | 950 | 35 | 550 |
| 57 | (Ce + La) →Ca | 1250 | 950 | 35 | 550 |
| 58 | (Ce + La) →Ca | 1250 | 950 | 35 | 550 |
| 59 | (Ce + La) →Ca | 1250 | 950 | 35 | 550 |
| 60 | (Ce + La) →Ca | 1250 | 950 | 35 | 550 |
| 61 | (Ce + La) →Ca | 1250 | 950 | 35 | 550 |
| 62 | (Ce + La) →Ca | 1250 | 950 | 35 | 550 |
| 63 | (Ce + La) →Ca | 1250 | 950 | 35 | 550 |
| 64 | (Ce + La) →Ca | 1250 | 950 | 35 | 550 |
| 65 | (Ce + La) →Ca | 1250 | 950 | 35 | 550 |
| 66 | (Ce + La) →Ca | 1250 | 950 | 35 | 350 |
| 67 | (Ce + La) →Ca | 1250 | 950 | 35 | 520 |
| 68 | (Ce + La) →Ca | 1250 | 950 | 35 | 520 |
| 69 | (Ce + La) →Ca | 1250 | 950 | 35 | 520 |
| 70 | (Ce + La) →Ca | 1250 | 950 | 35 | 520 |
| 71 | (Ce + La) →Ca | 1250 | 950 | 35 | 530 |
| 72 | (Ce + La) →Ca | 1250 | 950 | 35 | 550 |
| 73 | (Ce + La) →Ca | 1250 | 950 | 35 | 550 |
| 74 | (Ce + La) →Ca | 1250 | 950 | 35 | 550 |
| 75 | (Ce + La) →Ca | 1250 | 950 | 35 | 550 |
| 76 | (Ce + La) →Ca | 1250 | 950 | 35 | 550 |
| 77 | (Ce + La) →Ca | 1250 | 950 | 35 | 550 |
| 78 | (Ce + La) →Ca | 1250 | 950 | 35 | 550 |
| 79 | (Ce + La) →Ca | 1250 | 950 | 35 | 550 |
| 80 | (Ce + La) →Ca | 1250 | 950 | 35 | 550 |
| 81 | (Ce + La) →Ca | 1250 | 950 | 35 | 550 |
| 82 | (Ce + La) →Ca | 1250 | 950 | 35 | 550 |
| 83 | (Ce + La) →Ca | 1250 | 950 | 35 | 550 |
| 84 | (Ce + La) →Ca | 1250 | 950 | 35 | 550 |
| 85 | (Ce + La) →Ca | 1250 | 950 | 35 | 550 |
| 86 | (Ce + La) →Ca | 1250 | 950 | 35 | 550 |
| 87 | Ca→ (Ce + La) | 1250 | 950 | 35 | 550 |

TABLE 9

| | |
|---|---|
| Welded pipe diameter | φ140 mm |
| Welded pipe thickness | t9.5 mm |
| Amount of weld upset | 1/2t |
| Welding heat input | 1100 kW |
| Welding speed | 30 m/min |

TABLE 10

| Steel no. | Quality | | | | | | |
|---|---|---|---|---|---|---|---|
| | Base metal tensile strength (MPa) | Base metal toughness (J@0° C.) | Weld defect area ratio | Weld defect type | Main inclusion type | Weld zone toughness (J@0° C.) | Form of inclusion Long axis/ short axis |
| 51 | 500 | 400 | 0.02 | | XCaAlOS | 300 | 2.3 |
| 52 | 550 | 350 | 0.02 | | XCaAlOS | 250 | 2.4 |
| 53 | 590 | 450 | 0.02 | | XCaAlOS | 300 | 2.0 |
| 54 | 600 | 150 | 0.02 | | XCaAlOS | 120 | 2.3 |
| 55 | 590 | 300 | 0.02 | | XCaAlOS | 200 | 0.9 |
| 56 | 560 | 400 | 0.02 | | XCaAlOS | 250 | 2.0 |
| 57 | 610 | 350 | 0.02 | | XCaAlOS | 230 | 2.0 |
| 58 | 610 | 400 | 0.02 | | XCaAlOS | 220 | 2.0 |
| 59 | 610 | 400 | 0.02 | | XCaAlOS | 200 | 2.0 |
| 60 | 610 | 460 | 0.02 | | XCaAlOS | 250 | 2.0 |
| 61 | 615 | 350 | 0.04 | | XCaAlOS | 150 | 2.0 |
| 62 | 560 | 430 | 0.02 | | XCaAlOS | 250 | 2.0 |
| 63 | 620 | 350 | 0.02 | | XCaAlOS | 230 | 2.0 |
| 64 | 610 | 350 | 0.02 | | XCaAlOS | 230 | 2.0 |
| 65 | 580 | 350 | 0.02 | | XCaAlOS | 230 | 2.0 |
| 66 | 550 | 350 | 0.02 | | XCaAlOS | 300 | 2.3 |
| 67 | 380 | 500 | 0.02 | | XCaAlOS | 400 | 2.0 |
| 68 | — | — | — | | — | — | Cannot be stably produced |
| 69 | 450 | 400 | 0.02 | | XCaAlOS | 300 | 2.4 |
| 70 | 520 | 350 | 1.00 | $SiO_2$ | XCaAlOS | 10 | 2.4 |
| 71 | 480 | 450 | 0.01 | | XCaAlOS | 320 | 2.3 |
| 72 | 600 | 110 | 0.50 | MnO | XCaAlOS | 10 | 2.3 |
| 73 | 650 | 90 | 0.01 | | XCaAlOS | 80 | 2.0 |
| 74 | 560 | 300 | 0.01 | | MnS | 70 | 2.7 |
| 75 | 550 | 250 | 0.01 | | $CaOAl_2O_3$ | 80 | 3.0 |
| 76 | 650 | 90 | 0.01 | | XCaAlOS | 120 | 2.0 |
| 77 | 600 | 300 | 0.01 | | $CaOAl_2O_3$ | 70 | 10.4 |
| 78 | 600 | 300 | 0.15 | $Al_2O_3$ | XCaAlOS | 30 | 0.5 |
| 79 | 480 | 300 | 0.01 | | XCaAlOS | 280 | 0.9 |
| 80 | 550 | 70 | 0.01 | | XCaAlOS | 105 | 0.9 |
| 81 | 630 | 150 | 0.02 | | XCaAlOS | 85 | 2.9 |
| 82 | 630 | 150 | 0.02 | | $CaOAl_2O_3$ | 60 | 6.4 |
| 83 | 600 | 300 | 0.02 | | $CaOAl_2O_3$ | 70 | 3.8 |

TABLE 10-continued

| | | | Quality | | | | |
|---|---|---|---|---|---|---|---|
| Steel no. | Base metal tensile strength (MPa) | Base metal toughness (J@0° C.) | Weld defect area ratio | Weld defect type | Main inclusion type | Weld zone toughness (J@0° C.) | Form of inclusion Long axis/ short axis |
| 84 | — | — | — | — | — | — | Cannot be stably produced |
| 85 | 600 | 300 | 0.02 | | $CaOAl_2O_3$ | 80 | 3.0 |
| 86 | 600 | 90 | 0.01 | | XCaAlOS | 80 | 2.0 |
| 87 | 950 | 110 | 0.02 | | $CaOAl_2O_3$ | 70 | 2.0 |

REFERENCE SIGNS LIST 11. steel plate
12. inclusions ($mCaO \cdot nAl_2O_3$)
21. steel plate
22. inclusions (XCaAlOS)

The invention claimed is:

1. An electric resistance welded steel pipe excellent in weld zone quality,
wherein a chemical composition of a steel plate forming a base metal of the electric resistance welded steel pipe contains, by mass %,
C: 0.03 to 0.15%,
Si: 0.1 to 0.3%,
Mn: 0.5 to 2.0%,
Al: 0.01 to 0.06%,
Ti: 0.011 to 0.023%,
Ca: 0.001 to 0.005%,
one or both of Ce and La: 0.001 to 0.005%,
P: 0.03% or less,
S: 0.0015% or less,
O: 0.002% or less, and
N: 0.005% or less,
further contains one or more of
Nb: 0.1% or less,
V: 0.1% or less,
Mo: 0.2% or less, and
B: 0.002% or less, and
a balance of iron and unavoidable impurities;
the contents of Ca, O, S, Ce, La, and Al satisfying formula:

$$XCASO = \left(\frac{Ca}{O} + \frac{Ca}{S} + 0.285\frac{Ce+La}{O} + 0.285\frac{Ce+La}{S}\right) \times \left(\frac{Al}{Ca}\right) > 78;$$

oxide-based inclusions at a weld zone of the electric resistance welded steel pipe contain one or both of Ce and La; and
a long axis/short axis of the oxide-based inclusions is 2.5 or less.

2. The electric resistance welded steel pipe excellent in weld zone quality according to claim 1, wherein the chemical composition of the steel plate further contains, by mass %, one or more of
Cu: 0.1 to 2%,
Ni: 0.05 to 1%,
Cr: 0.01 to 1%, and
Zr: 0.001 to 0.01%.

3. The electric resistance welded steel pipe excellent in weld zone quality according to claim 1 or 2, wherein
a tensile strength of the base metal is 860 MPa or more,
a toughness of the base metal at 0° C. is 100 J or more, and
a toughness of a weld zone of the electric resistance welded steel pipe at 0° C. is 40 J or more.

4. The electric resistance welded steel pipe excellent in weld zone quality according to claim 1 or 2, wherein
a tensile strength of the base metal is 500 MPa to 620 MPa,
a toughness of the base metal at −40° C. is 100 J or more, and
a weld zone toughness of a weld zone of the electric resistance welded steel pipe at −40° C. is 100 J or more.

5. A method of production of electric resistance welded steel pipe excellent in weld zone quality, comprising the steps of:
in a refining process of steelmaking, adjusting a chemical composition of a molten steel so as to contain, by mass %,
C: 0.03 to 0.15%,
Si: 0.1 to 0.3%,
Mn: 0.5 to 2.0%,
Al: 0.01 to 0.06%,
Ti: 0.011 to 0.023%,
P: 0.03% or less,
S: 0.0015% or less,
O: 0.002% or less, and
N: 0.005% or less,
further contain one or more of
Nb: 0.1% or less,
V: 0.1% or less,
Mo: 0.2% or less, and
B: 0.002% or less, and
a balance of iron and unavoidable impurities;
then adding one or both of Ce and La to the molten steel to give total contents of Ce and La of 0.001 to 0.005%;
then adding Ca to the molten steel to give a content of Ca of 0.0010 to 0.0050%, and adjusting the contents of Ca, O, S, Ce, La, and Al so as to satisfy the formula:

$$XCASO = \left(\frac{Ca}{O} + \frac{Ca}{S} + 0.285\frac{Ce+La}{O} + 0.285\frac{Ce+La}{S}\right) \times \left(\frac{Al}{Ca}\right) > 78;$$

manufacturing a steel slab from the molten steel;
hot rolling the steel slab to obtain hot rolled steel plate;
coiling the hot rolled steel plate; and
manufacturing electric resistance welded steel pipe from the coiled hot rolled steel plate.

6. The method of production of electric resistance welded steel pipe excellent in weld zone quality according to claim 5, wherein in the refining process of steelmaking, the chemical composition before adding one or both of Ce and La to the molten steel further contains, by mass %,
one or more of
Cu: 0.1 to 2%
Ni: 0.05 to 1%
Cr: 0.01 to 1%, and
Zr: 0.001 to 0.01%.

* * * * *